(12) United States Patent
Lewis

(10) Patent No.: US 6,301,990 B1
(45) Date of Patent: Oct. 16, 2001

(54) LOCKING APPARATUS

(75) Inventor: Jonahtan A. Lewis, Cutler, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/524,848

(22) Filed: Mar. 14, 2000

(51) Int. Cl.[7] ............................... B62D 1/18; B62D 1/16
(52) U.S. Cl. ................................................. 74/493; 74/492
(58) Field of Search ................... 74/492, 493; 280/775, 280/777

(56) References Cited

U.S. PATENT DOCUMENTS

| | | | |
|---|---|---|---|
| 4,244,237 | * | 1/1981 | Sprunger ................................. 74/493 |
| 5,363,716 | | 11/1994 | Budzik, Jr. et al. . |
| 5,394,767 | * | 3/1995 | Hoblingre et al. ...................... 74/493 |
| 5,439,252 | * | 8/1995 | Oxley et al. .......................... 280/775 |
| 5,607,184 | * | 3/1997 | Barton .................................. 280/775 |
| 5,678,454 | * | 10/1997 | Cartwright et al. .................... 74/493 |
| 5,743,150 | * | 4/1998 | Fevre et al. ............................. 74/493 |
| 5,761,966 | * | 6/1998 | Cuiller et al. .......................... 74/493 |
| 5,813,289 | * | 9/1998 | Renick et al. ......................... 74/493 |

FOREIGN PATENT DOCUMENTS

0443881A2 * 8/1991 (EP) .

61-77564 * 4/1986 (JP) .

OTHER PUBLICATIONS

Co–pending U.S. Patent Appln. Serial No. 09/196,018, filed Nov. 19, 1998 entitled, "Steering Column".
Co–pending U.S. Patent Appln. Serial No. 09/275,715, filed Mar. 24, 1999 entitled, "Steering Column".

* cited by examiner

Primary Examiner—David Fenstermacher
(74) Attorney, Agent, or Firm—Tarolli, Sundheim, Covell, Tummino & Szabo L.L.P.

(57) ABSTRACT

An apparatus (20) includes a housing (90) and a longitudinal member (80) movable in opposite directions relative to the housing. A first cam (176) is pivotable relative to the housing (90). The first cam (176) is engageable with the longitudinal member (80) to prevent movement of the of the longitudinal member in a first direction relative to the housing (90). A second cam (186) is pivotable relative to the housing (90). The second cam (186) is engageable with the longitudinal member (80) to prevent movement of the longitudinal member in a second direction opposite the first direction relative to the housing (90). At least one spring (210) biases the first and second cams (176, 186) into engagement with the longitudinal member (80). An actuator (250) moves the first and second cams (176, 186) out of engagement with the longitudinal member (80) to permit movement of the longitudinal member relative to the housing (90).

14 Claims, 6 Drawing Sheets

LOCKING APPARATUS

FIELD OF THE INVENTOR

The present invention relates to a locking apparatus which prevents movement of a longitudinal member relative to a housing. More specifically, the present invention relates to a locking apparatus for use in a steering column in which a first steering column member is pivotable relative to a second steering column member.

BACKGROUND OF THE INVENTION

A known steering column includes a first steering column member which can be pivoted relative to a second steering column member. A longitudinal member has an end portion moveable with the first steering column member relative to the second steering column member. The longitudinal member moves relative to the second steering column member upon pivoting of the first steering column member to any one of a plurality of pivot positions relative to the second steering column member.

A pair of coil springs are normally tightly wound around the periphery of the longitudinal member so that, when fully wound, they grip the longitudinal member and prevent relative movement between the longitudinal member and the second steering column member. Rotation of a lever about an axis of the longitudinal member causes the springs to become partially unwound and release their grip on the longitudinal member. When the springs become unwound, the first steering column member can be pivoted relative to the second steering column member.

SUMMARY OF THE INVENTION

The locking apparatus of the present invention includes a housing and a longitudinal member movable in first and second opposite directions relative to the housing. First and second cams are pivotable relative to the housing. The first cam is engageable with the longitudinal member to prevent movement of the longitudinal member in the first direction relative to the housing. The second cam is engageable with the longitudinal member to prevent movement of the longitudinal member in the second direction. At least one spring biases the first and second cams into engagement with the longitudinal member. An actuator moves the first and second cams out of engagement with the longitudinal member to permit movement of the longitudinal member relative to the housing.

The longitudinal member has an end portion movable with a first steering column member relative to a second steering column member. The longitudinal member moves relative to the second steering column member upon pivoting of the first steering column member to any one of a plurality of pivot positions relative to the second steering column member. The first and second cams are engageable with the longitudinal member to prevent movement of the longitudinal member relative to the second steering column member and prevent pivoting of the first steering column member relative to the second steering column member. The longitudinal member is movable relative to the second steering column member and enables pivoting of the first steering column member relative to the second steering column member when the first and second cams are spaced from the longitudinal member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
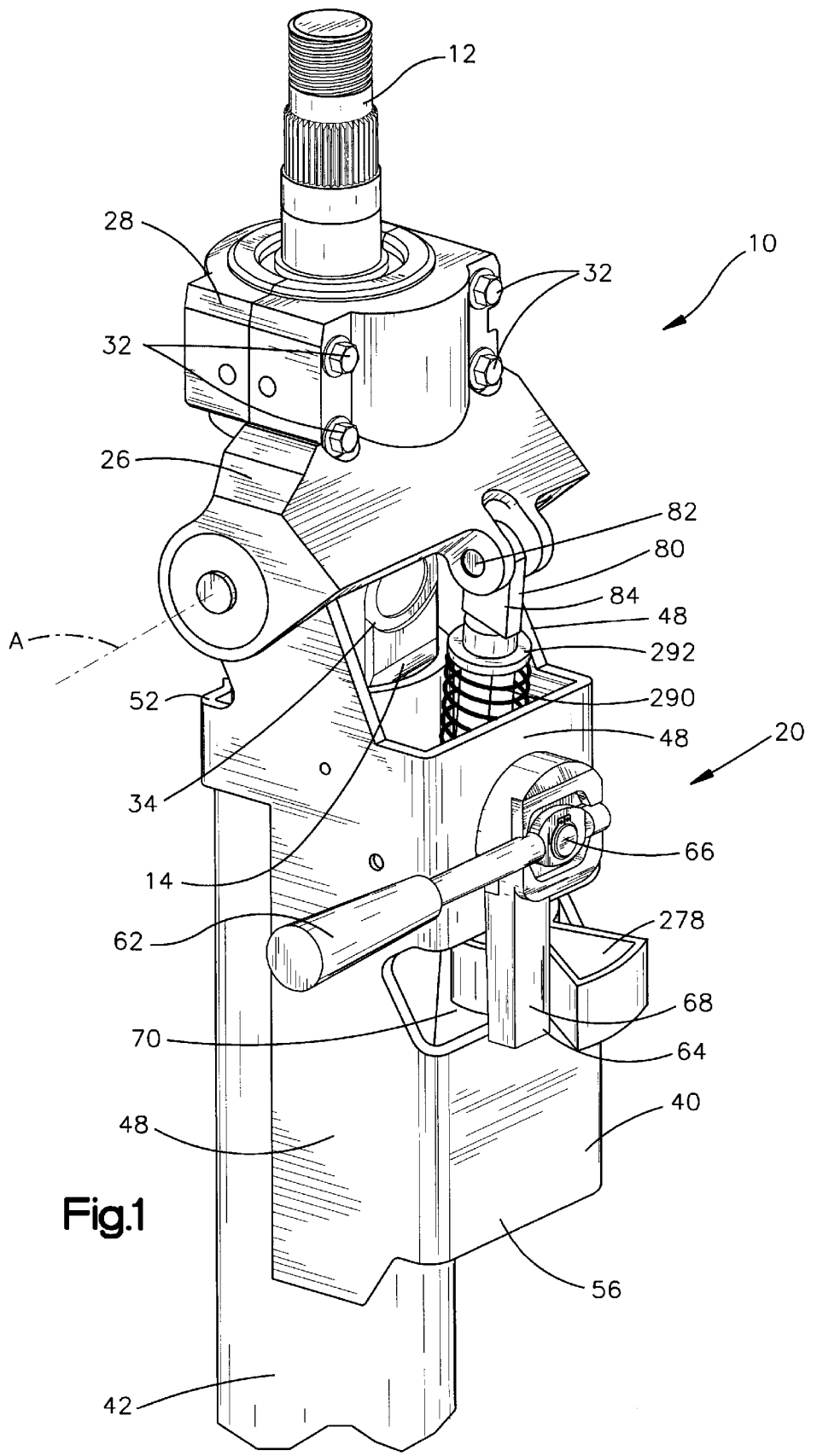
FIG. 1 is a pictorial illustration of a steering column including the locking apparatus of the present invention.

The present invention relates to a locking apparatus for preventing pivotal movement between first and second steering column members. As representative of the present invention, FIG. 1 illustrates schematically an angularly adjustable vehicle steering column 10. The steering column 10 is connectable to a frame of a vehicle in any manner known in the art, such as by mounting brackets. The steering column 10 includes an input shaft or steering column member 12 and a steering column member 14 which are rotatable to move steerable wheels of a vehicle (not shown).

A vehicle steering wheel 16 (FIG. 2) is attached to the steering column member 12 by a nut 18. The steering column member 12 and steering column member 14 rotate upon rotation of the vehicle steering wheel 16 by an operator of the vehicle. The steering column member 12 is pivotable relative to the steering column member 14 to affect angular adjustment of the steering wheel 16.

A releasable locking apparatus 20 (FIG. 1) locks the steering column member 12 in any one of an infinite number of pivot positions relative to the steering column member 14. The steering column member 12 extends into an upper housing 26 and is rotatable relative to the upper housing. Bearings (not shown) located in the upper housing 26 support the steering column member 12 for rotation relative to the upper housing. A cover 28 is removable from the upper housing 26 so that the bearings may be reached for repair and maintenance. The cover 28 is connected to the upper housing 26 by fasteners 32.

A universal joint 34 (FIGS. 1 and 2) interconnects the steering column members 12 and 14. The steering column member 12 is connected to one yoke of the universal joint 34. Another yoke of the universal joint 34 is connected to the steering column member 14. The steering column member 12 and upper housing 26 can pivot, relative to the steering column member 14, about a pivot axis A of the universal joint 34. From the above, it should be clear that upon rotation of the steering wheel 16, the steering column member 12 and the steering column member 14 rotate.

A bracket 40 (FIG. 1) pivotally supports the upper housing 26 and steering column member 12 for pivotal movement relative to the steering column member 14. The upper housing 26 is pivotally connected to the bracket 40 which is connected to a mounting member or support tube 42 circumscribing the steering column member 14. The support tube 42 supports the steering column member 14 for rotation and connects the steering column 10 to the frame of the vehicle, as known in the art. The upper housing 26 is pivotable about the axis A relative to the bracket 40 and the support tube 42. Therefore, the upper housing 26 pivots along with the steering column member 12 relative to the bracket 40 and the steering column member 14.

The bracket 40 includes generally parallel side walls 48. Portions 52 (FIG. 2) extending radially inwardly from the side walls 48 are connected to an upper portion of the support tube 42. A portion 56 (FIG. 1) of the bracket 40 extends between the side walls 48.

A handle 62 and actuator member 64 (FIG. 1) are pivotally mounted on the portion 56 of the bracket 40 by a pin 66. The handle 62 releases the locking apparatus 20 to permit tilting of the steering column member 12 relative to the steering column member 14. A portion 68 of the actuator 64 engages a portion of the locking apparatus 20 that extends through an opening 70 in the portion 56 of the bracket 40.

Figure 2:
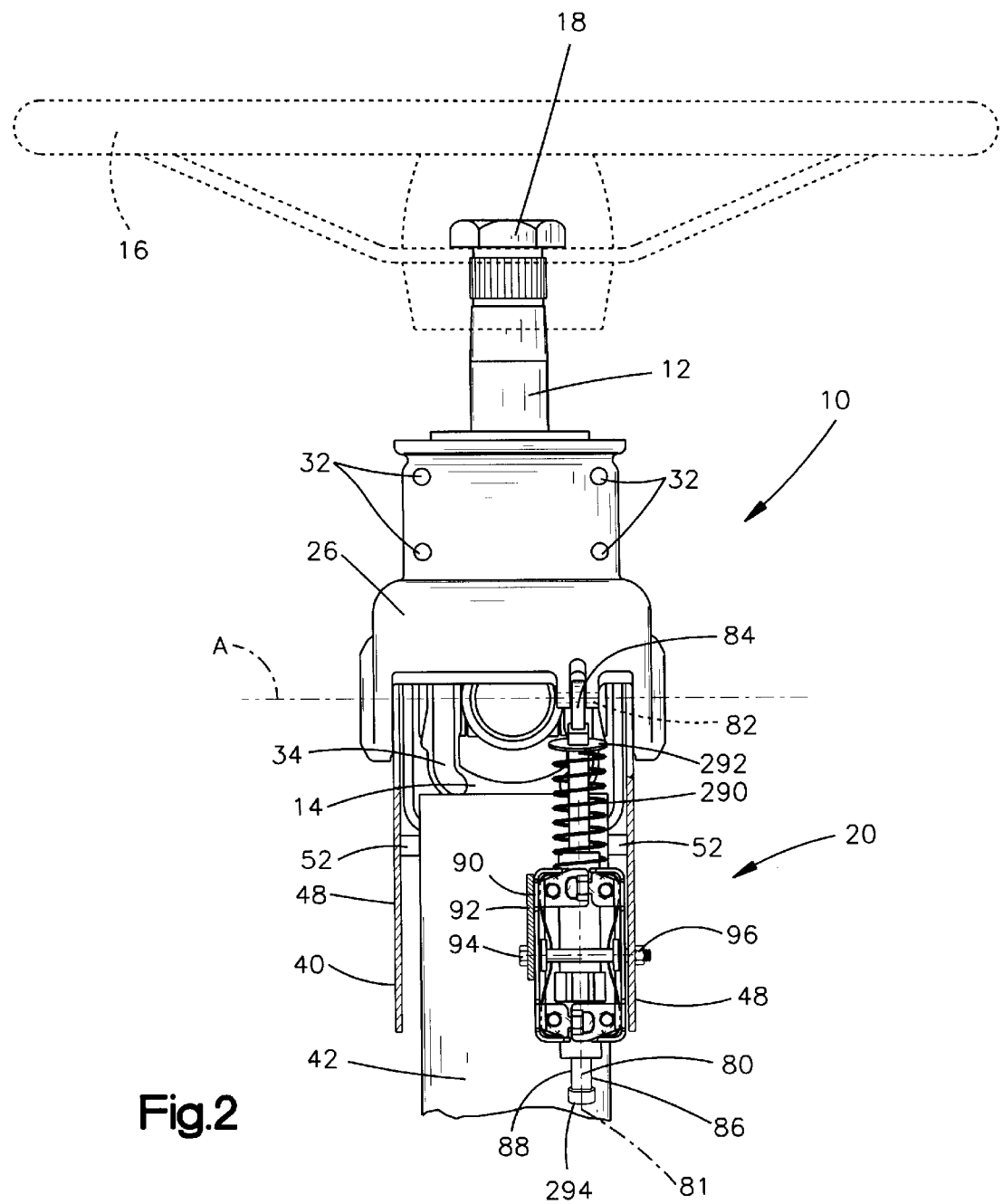
FIG. 2 is a schematic sectional view of a portion of the steering column of FIG. 1.

A longitudinal member 80, having a longitudinal axis 81, is pivotally connected to the upper housing 26 by a pin 82 (FIGS. 1 and 2). An end portion 84 of the longitudinal member 80 moves with the steering column member 12 relative to the steering column member 14. The locking apparatus 20 locks the longitudinal member 80 in one of an infinite number of positions relative to the steering column member 14.

When the longitudinal member 80 is locked in one of the positions, the steering column member 12 is locked in one of the infinite number of positions relative to the steering column member 14. The longitudinal member 80 (FIG. 2) has side surfaces 86 and 88 extending parallel to the axis 81 and each other. The longitudinal member 80 extends through a housing 90 which is pivotally connected between one of the side walls 48 and a flange 92 of the bracket 40 by a bolt 94 and nut 96.

Figure 3A:
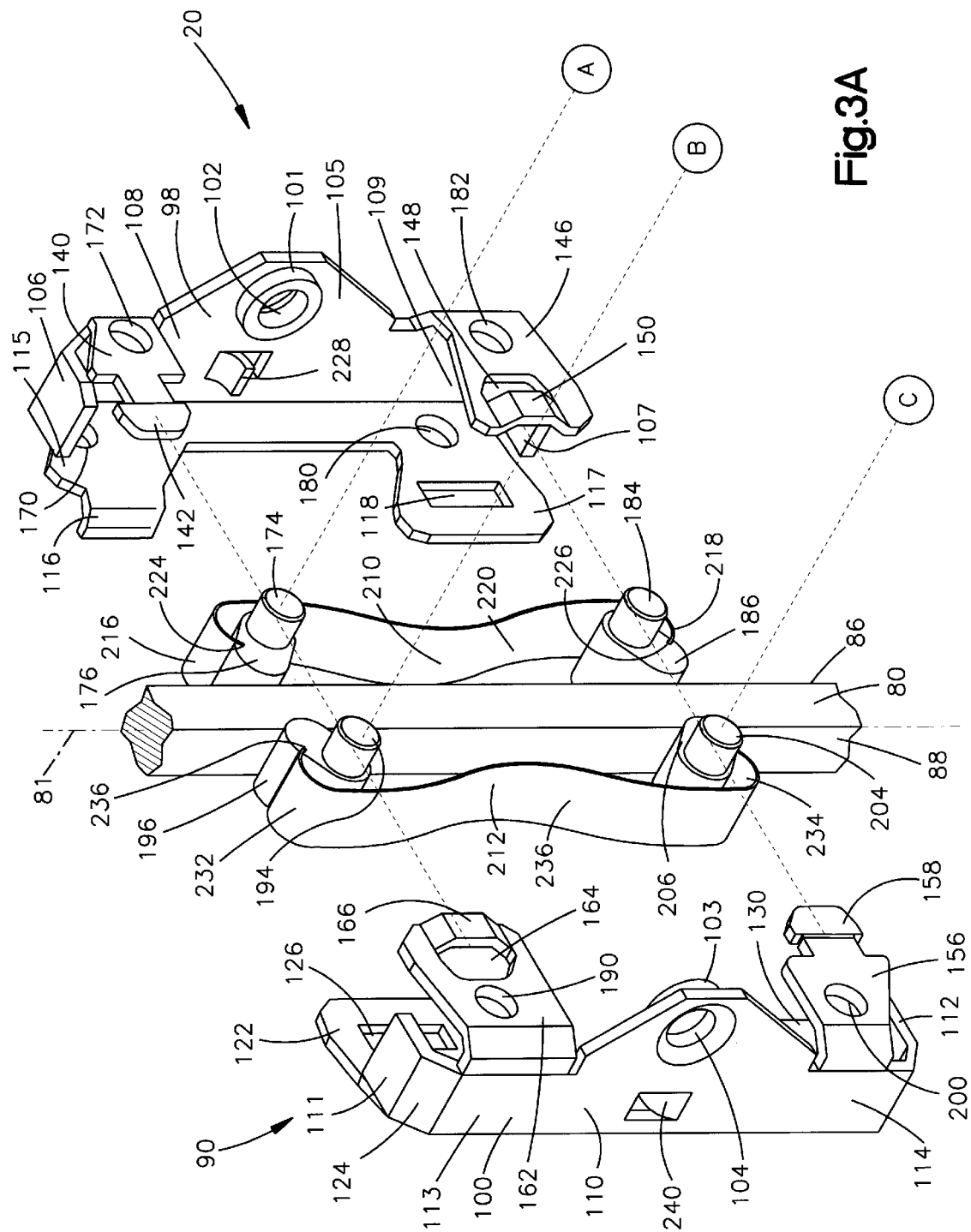
FIG. 3A is an exploded pictorial illustration of the locking apparatus of the steering column of FIG. 1.

The housing 90 (FIG. 3A) has first and second identical housing members 98 and 100 that are interconnected. The housing member 98 has a boss 101 defining an opening 102 through which the bolt 94 extends. The housing member 100 has a boss 103 defining an opening 104 through which the bolt 94 extends. The bolt 94 (FIG. 2) extends through the openings 102 and 104 to pivotally connect the housing 90 between one of the side walls 48 and the flange 92.

The housing member 98 (FIGS. 3A and 4) has a wall 105 extending parallel to the longitudinal member 80. Guide portions 106 and 107 extend from axial ends 108 and 109 of the wall 105 toward the longitudinal member 80. The housing member 100 has a wall 110 extending parallel to the longitudinal member 80. Guide portions 111 and 112 extend from axial ends 113 and 114 of the wall 110 toward the longitudinal member 80. The guide portions 106, 107, 111, and 112 engage the longitudinal member 80 to guide movement of the longitudinal member relative to the housing 90.

The housing member 98 has a portion 115 (FIG. 3A) extending from the end 108 of the wall 105 toward the longitudinal member 80. A hook 116 extends generally perpendicular to the portion 115. A slotted portion 117 with a slot 118 extends from the end 109 of the wall 105 toward the longitudinal member 80. The hook 116 and slot 118 interconnect the housing members 98 and 100.

The housing member 100 has a slotted portion 122 extending from the end 113 of the wall 110 toward the longitudinal member 80. The slotted portion 122 of the housing member 100 includes a slot 126 for receiving the hook 116 on the housing member 98 to interconnect the housing members 98 and 100. The housing member 100 has a portion 130 extending from the end 114 of the wall 110 toward the longitudinal member 80. A hook (not shown) extends generally perpendicular to the portion 130. The slot 118 in the housing member 98 receives the hook extending from of the housing member 100 to interconnect the housing members 98 and 100.

The housing member 98 includes a resilient portion 140 extending from the end 108 parallel to the portion 115. The portion 140 has a projection 142. An extension 146 extends from the end 109 and parallel to the slotted portion 117. The extension 146 has an opening 148 partially defined by an upstanding portion 150.

The housing member 100 (FIGS. 3A and 4) has a resilient portion 156 extending from the end 114 parallel to the portion 130. The portion 156 has a projection 158. The projection 158 snaps into the opening 148 of the extension 146 on the housing member 98. The projection 158 engages the upstanding portion 150 to retain the projection 158 in the opening 148 and interconnect the housing members 98 and 100.

The housing member 100 has an extension 162 extending from the end 113 parallel to the slotted portion 122. The extension 162 has an opening 164 which is partially defined by an upstanding portion 166. The projection 142 on the housing member 98 snaps into the opening 164. The projection 142 engages the upstanding portion 166 to retain the projection 142 in the opening 164 and interconnect the housing members 98 and 100.

The housing members 98 and 100 are snapped together to form the housing 90. The hook 116 on the housing member 98 is inserted into the slot 126 on the housing member 100. The hook 134 on the housing member 100 is inserted into the slot 118 on the housing member 98. The resilient portion 140 on the housing member 98 is moved toward the extension 162 and the resilient portion 156 on the housing member 100 is moved toward the extension 146. When the projections 142 and 158 engage the extensions 162 and 146, the resilient portions 140 and 146 deflect slightly. The projections 142 and 158 snap into the openings 164 and 148 to interconnect the housing members 98 and 100.

The portion 115 (FIG. 3A) of the housing member 98 has an opening 170 axially aligned with an opening 172 in the resilient portion 140. The openings 170 and 172 pivotally support a pin 174 of a cam 176. The slotted portion 117 of the housing member 98 has an opening 180 axially aligned with an opening 182 in the extension 146. The openings 180 and 182 pivotally support a pin 184 of a cam 186.

The extension 162 of the housing member 100 has an opening 190 in axial alignment with an opening (not shown) in the slotted portion 122. The opening 190 and the opening in the portion 122 pivotally support a pin 194 of a cam 196. The resilient portion 156 of the housing member 100 has an opening 200 in axial alignment with an opening (not shown) in the portion 130. The opening 200 and the opening in the portion 130 pivotally support a pin 204 of a cam 206.

Figure 4:
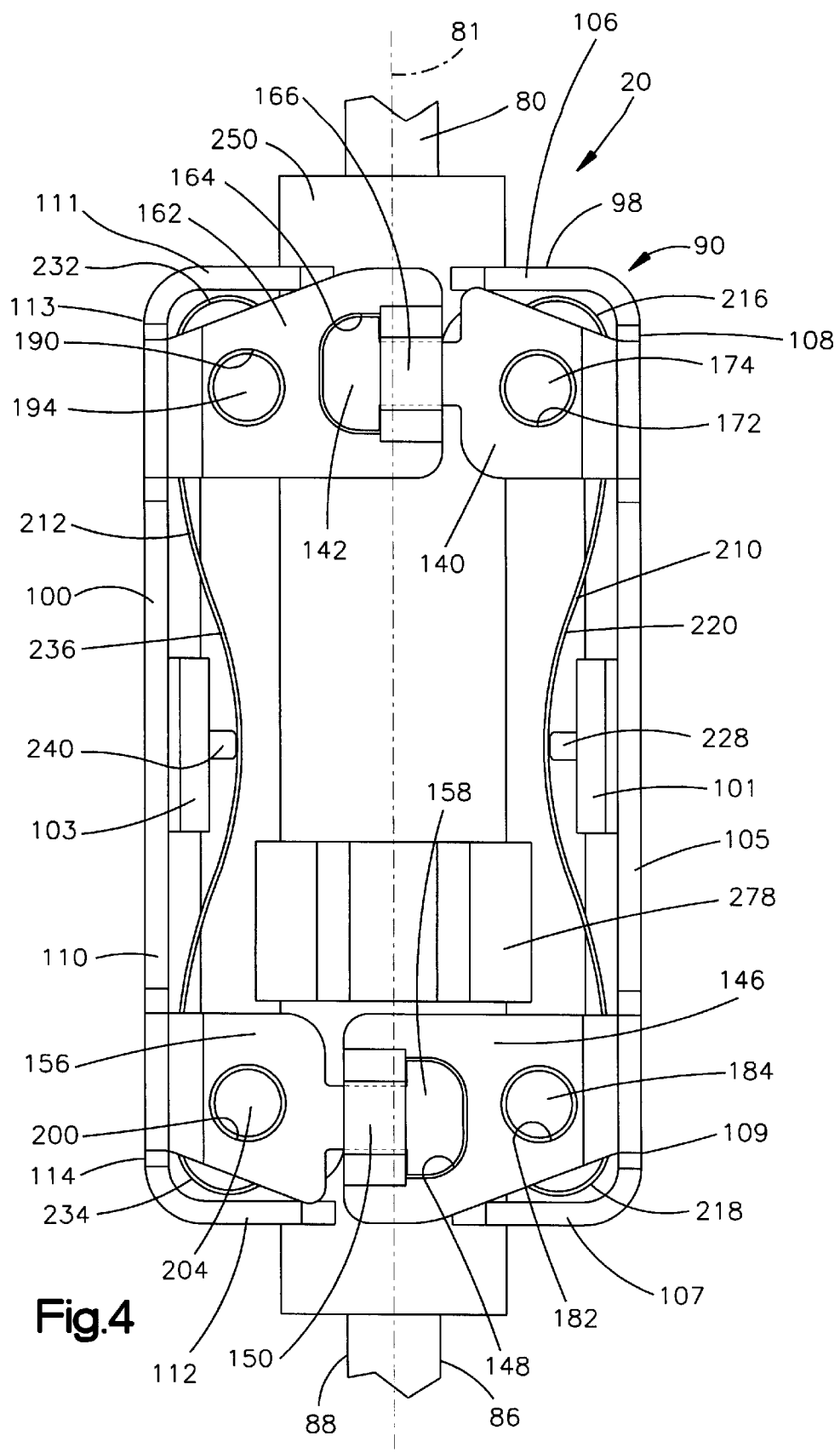
FIG. 4 is an enlarged schematic view of the locking apparatus of the steering column of FIG. 1.
Figure 5:
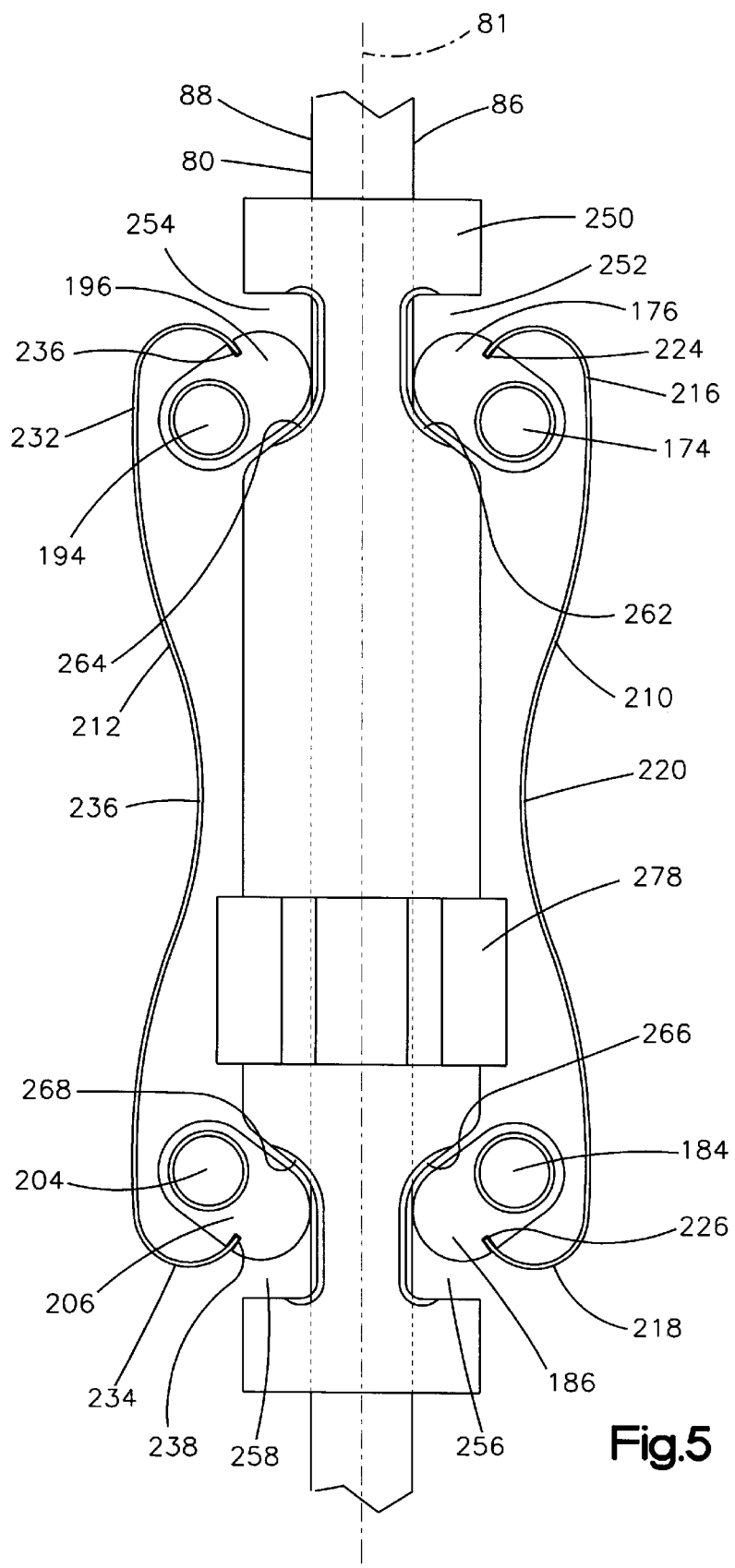
FIG. 5 is an enlarged schematic view of a portion of the locking apparatus of FIG. 4.

The cams 176 and 196 are engageable with the side surfaces 86 and 88 of the longitudinal member 80 to prevent movement of the longitudinal member 80 in a downward direction as viewed in FIGS. 4 and 5. If a force is applied to the longitudinal member 80 in the downward direction while the cams 176 and 196 are in engagement with the longitudinal member, the cams 176 and 196 pivot toward the longitudinal member to increase the force applied to the longitudinal member by the cams 176 and 196 to prevent movement of the longitudinal member. The cams 186 and 206 are engageable with the side surfaces 86 and 88 of the longitudinal member 80 to prevent movement of the longitudinal member in an upward direction, as viewed in FIGS.

4 and 5. If a force is applied to the longitudinal member 80 in the upward direction while the cams 186 and 206 are in engagement with the longitudinal member, the cams 186 and 206 pivot toward the longitudinal member to increase the force applied to the longitudinal member by the cams 186 and 206 to prevent movement of the longitudinal member.

Figure 3B:
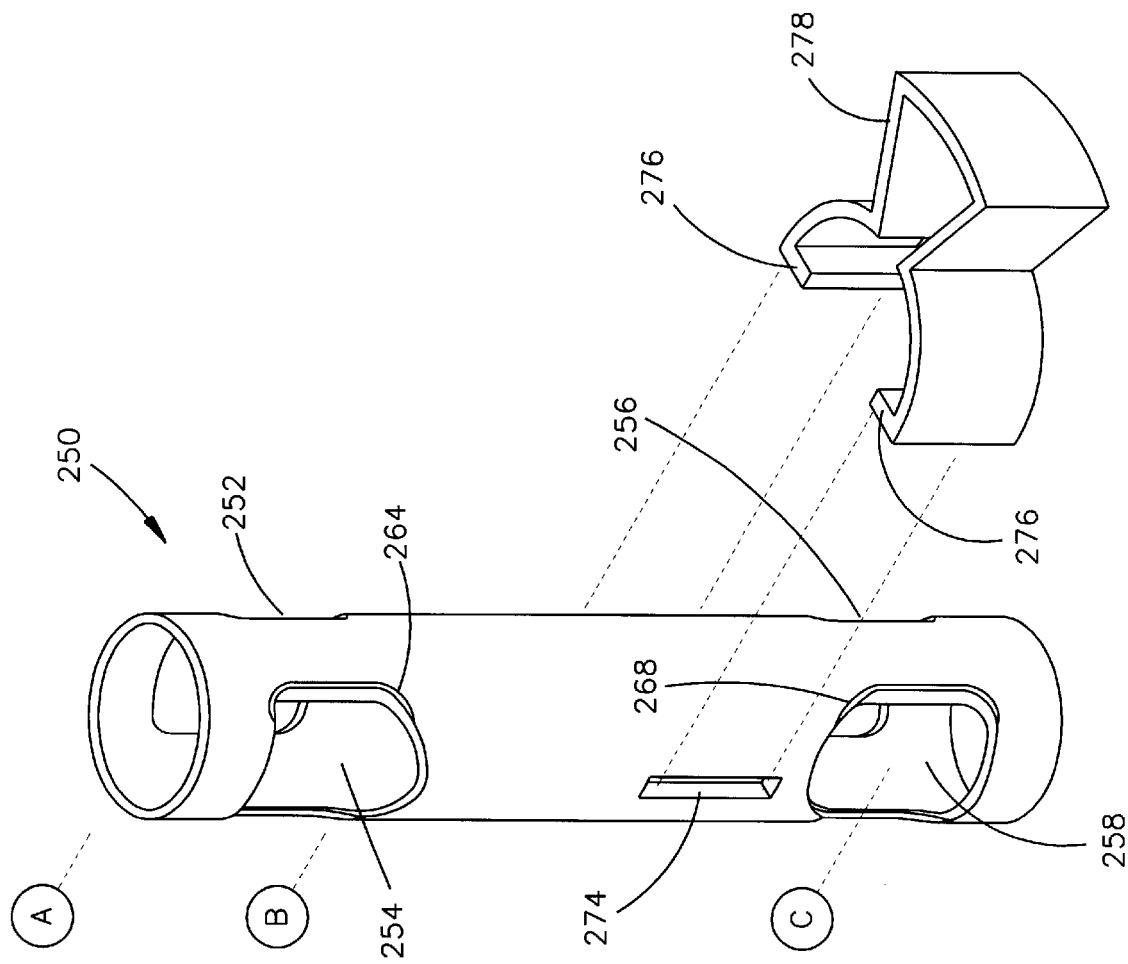
FIG. 3B is an exploded pictorial illustration of an actuator of the locking apparatus of FIG. 1.

A flat spring 210 (FIGS. 3–4) biases the cams 176 and 186 into engagement with the side surface 86 of the longitudinal member 80. A flat spring 212 biases the cams 196 and 206 into engagement with the side surface 88 of the longitudinal member 80. The springs 210 and 212 bias the cams 176, 186, 196, and 206 into engagement with the longitudinal member 80 to prevent movement of the longitudinal member relative to the housing 90.

The flat spring 210 (FIG. 5) has ends 216 and 218 interconnected by a main portion 220. The end 216 of the flat spring 210 is located within a slot 224 in the cam 176. The end 218 of the flat spring 210 is located within a slot 226 of the cam 186. A tab 228 (FIGS. 3A and 4) extending from the wall 105 engages the portion 220 of the flat spring 210. The tab 228 deforms the portion 220 of the flat spring 210 toward the longitudinal member 80 to cause the spring to bias the cams 176 and 186 into engagement with the longitudinal member.

The flat spring 212 (FIG. 5) has ends 232 and 234 interconnected by a main portion 236. The end 232 of the flat spring 212 is located within a slot 236 in the cam 196. The end 234 of the flat spring 212 is located within a slot 238 in the cam 206. A tab 240 (FIGS. 3A and 4) extending from the wall 110 engages the portion 236 of the flat spring 212. The tab 240 deforms the portion 236 of the flat spring 212 toward the longitudinal member 80 to cause the flat spring to bias the cams 196 and 206 into engagement with the longitudinal member 80.

A cylindrical actuator 250 (FIGS. 3B and 5) is coaxial with and circumscribes the longitudinal member 80. The actuator 250 is pivotable about the axis 81 from an initial locking position, shown in FIG. 5, to release the longitudinal member 80 for movement relative to the housing 90. The actuator 250 is pivotable about the axis 81 to pivot the cams 176, 186, 196, and 206 against the bias of flat springs 210 and 212 out of engagement with the longitudinal member.

The actuator 250 has openings 252 and 254 diametrically opposed to each other through which the cams 176 and 196 extend. The actuator 250 has openings 256 and 258 diametrically opposed to each other through which cams 186 and 206 extend. The cam 176 extends through the opening 252 into engagement with the longitudinal member 80. The cam 186 extends through the opening 256 into engagement with the longitudinal member 80. The cam 196 extends through the opening 254 into engagement with the longitudinal member 80. The cam 206 extends through the opening 258 into engagement with the longitudinal member 80.

The opening 252 is partially defined by a surface 262 (FIG. 5) extending at an acute angle to the axis 81 of the actuator 250. The surface 262 engages the cam 176 to move the cam 176 in a clockwise direction, as viewed in FIG. 5, out of engagement with the longitudinal member 80 upon pivoting of the actuator from the initial position about the axis 81. The opening 254 is partially defined by a surface 264 extending at an acute angle to the axis 81. The surface 264 engages the cam 196 to move the cam 196 in a counterclockwise direction out of engagement with the longitudinal member 80 upon pivoting of the actuator 250 from the initial position.

The opening 256 in the actuator 250 is partially defined by a surface 266 extending at an acute angle to the axis 81. The surface 266 engages the cam 186 to move the cam 186 in a counterclockwise direction out of engagement with the longitudinal member 80 upon pivoting of the actuator 250 from the initial position. The opening 258 is partially defined by a surface 268 extending at an acute angle to the axis 81. The surface 268 engages the cam 206 to move the cam 206 in a clockwise direction out of engagement with the longitudinal member 80 upon pivoting of the actuator member 250 from the initial position.

The actuator member 250 includes a pair of diametrically opposed slots 274. Radially inwardly extending flanges 276 of lever 278 engage the slots 274. The lever 278 (FIG. 1) extends through the opening 70 in the bracket 40. The actuator member 64 engages the lever 278.

A coil spring 290 circumscribing the longitudinal member 80 extends between the housing 90 and a flange 292 connected to the end 84 of the longitudinal member 80. The spring 290 biases the steering column member 12 to pivot in one direction relative to the steering column member 14. A stop 294 connected with the longitudinal member 80 engages the actuator 250 to limit pivotal movement of the steering column member 12 relative to the steering column member 14 in the one direction.

Upon pivoting the handle 62 and the actuator member 64 from an initial locked position, shown in FIG. 1, the actuator 250 pivots about the axis 81. The actuator 250 pivots from the initial locked position, shown in FIGS. 4 and 5, about the axis 81 of the longitudinal member 80. The surfaces 262, 264, 266, and 268 on the actuator 250 engage the cams 176, 186, 196, and 206 to move the cams out of engagement with the longitudinal member 80. The steering column member 12 can be pivoted relative to the steering column member 14. When the steering column member 12 is pivoted relative to the steering column member 14, the longitudinal member 80 moves relative to the housing 90 and the housing pivots about the bolt 94.

Upon release of the handle 62 after positioning the steering column member 12, the springs 210 and 212 move the cams 176, 186, 196, and 206 into engagement with the longitudinal member 80 to lock the steering column member 12 relative to the steering column member 14. The springs 210 and 212 also cause the handle 62 and the actuator 250 to move to their initial positions.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a housing;
   a longitudinal member movable in first and second opposite directions relative to said housing;
   a first cam pivotable relative to said housing, said first cam being engageable with said longitudinal member to prevent movement of said longitudinal member in the first direction relative to said housing;
   a second cam pivotable relative to said housing, said second cam being engageable with said longitudinal member to prevent movement of said longitudinal member in the second direction relative to said housing;
   at least one spring biasing said first and second cams into engagement with said longitudinal member; and
   an actuator for moving said first and second cams out of engagement with said longitudinal member to permit movement of said longitudinal member relative to said housing.

2. Apparatus as defined in claim 1 wherein said at least one spring biases said first cam to pivot in a first direction relative to said housing into engagement with said longitudinal member, said at least one spring biasing said second cam to pivot in a second direction into engagement with said longitudinal member.

3. Apparatus as defined in claim 2 wherein said at least one spring includes a flat spring having a first end engaging said first cam and a second end engaging said second cam.

4. Apparatus as defined in claim 1 wherein said actuator is engageable with said first and second cams to move said first and second cams out of engagement with said longitudinal member.

5. Apparatus as defined in claim 4 wherein said actuator circumscribes said longitudinal member and includes openings through which said first and second cams extend, said actuator being rotatable about a longitudinal axis of said longitudinal member.

6. Apparatus as defined in claim 1 wherein said at least one spring biases said actuator to the first position.

7. Apparatus as defined in claim 1 further including first and second steering column members pivotable relative to each other, said longitudinal member having an end portion movable with said first steering column member relative to said second steering column member, said longitudinal member moving relative to said second steering column member upon pivoting of said first steering column member to any one of a plurality of pivot positions relative to said second steering column member, said first and second cams being engageable with said longitudinal member to prevent movement of said longitudinal member relative to said second steering column member and prevent pivoting of said first steering column member relative to said second steering column member, said longitudinal member being movable relative to said second steering column member and enabling pivoting of said first steering column member relative to said second steering column member when said first and second cams are spaced from said longitudinal member.

8. Apparatus as defined in claim 1 further including:
   a third cam pivotable relative to said housing, said third cam being engageable with said longitudinal member to prevent movement of said longitudinal member in the first direction relative to said housing; and
   a fourth cam pivotable relative to said housing, said fourth cam being engageable with said longitudinal member to prevent movement of said longitudinal member in the second direction opposite the first direction relative to said housing;
   said at least one spring biasing said third and fourth cams into engagement with said longitudinal member.

9. Apparatus as defined in claim 8 wherein said longitudinal member includes first and second side surfaces extending generally parallel to each other, said first and second cams being engageable with said first side surface, said third and fourth cams being engageable with said second side surface.

10. Apparatus as defined in claim 8 wherein said at least one spring includes first and second flat springs, said first flat spring having a first end engaging said first cam and a second end engaging said second cam, said second flat spring having a first end engaging said third cam and a second end engaging said fourth cam.

11. Apparatus as defined in claim 8 wherein said actuator is engageable with said first, second, third, and fourth cams to move said first, second, third, and fourth cams out of engagement with said longitudinal member.

12. Apparatus as defined in claim 11 wherein said actuator circumscribes said longitudinal member and includes openings through which said first, second, third, and fourth cams extend, said actuator being rotatable about a longitudinal axis of said longitudinal member.

13. Apparatus as defined in claim 11 wherein said at least one spring biases said actuator to the first position.

14. Apparatus as defined in claim 8 further including first and second steering column members pivotable relative to each other, said longitudinal member having an end portion movable with said first steering column member relative to said second steering column member, said longitudinal member moving relative to said second steering column member upon pivoting of said first steering column member to any one of a plurality of pivot positions relative to said second steering column member, said first, second, third, and fourth cams being engageable with said longitudinal member to prevent movement of said longitudinal member relative to said second steering column member and prevent pivoting of said first steering column member relative to said second steering column member, said longitudinal member being movable relative to said second steering column member and enabling pivoting of said first steering column member relative to said second steering column member when said first, second, third, and fourth cams are spaced from said longitudinal member.

* * * * *